United States Patent [19]

Glöersen

[11] 4,135,966

[45] Jan. 23, 1979

[54] METHOD AND DEVICE FOR EQUALIZING THE MOISTURE CONTENT OF POROUS MATERIAL

[76] Inventor: Stig Glöersen, Edsgatan, POB 4502 Karlstad, Sweden

[21] Appl. No.: 611,925

[22] Filed: Sep. 10, 1975

[30] Foreign Application Priority Data

Sep. 10, 1974 [SE] Sweden .................................. 7411396

[51] Int. Cl.² .......................... D21C 1/02; D21C 3/24; D21C 7/00; D21C 7/06
[52] U.S. Cl. ........................................ 162/17; 162/49; 162/52; 162/63; 162/68; 162/237; 162/238; 162/246; 162/251
[58] Field of Search .................... 162/17, 49, 238, 237, 162/246, 251, 63, 68, 52, DIG. 10, DIG. 2

[56] References Cited

U.S. PATENT DOCUMENTS

| | | | |
|---|---|---|---|
| 2,858,211 | 10/1958 | Durant et al. .......................... | 162/237 |
| 3,012,927 | 12/1961 | Polleys ..................................... | 162/17 |
| 3,326,743 | 6/1967 | Bryce ..................................... | 162/237 X |
| 3,434,920 | 3/1969 | Green ..................................... | 162/237 |
| 3,607,618 | 9/1971 | Uschmann ............................. | 162/17 |
| 3,898,124 | 8/1975 | Olson ..................................... | 162/238 |

OTHER PUBLICATIONS

"Changes in Kraft Continuous Digester Instrumentation;" Morrison, Paper Trade Journal, Sep. 14, 1964.
"Computer Applications: Woodlands Through Bleach Plant-II;" Grant, Paper Trade Journal, Jun. 21, 1971.
"A Method for Determining the Moisture Content and Specific Gravity of Wood Chips in a Pressurized Water System;" Schmidt; TAPPI, Apr. 1968, vol. 51, No. 4.

*Primary Examiner*—S. Leon Bashore
*Assistant Examiner*—Steve Alvo
*Attorney, Agent, or Firm*—Birch, Stewart, Kolasch & Birch

[57] ABSTRACT

A process and apparatus for automatically maintaining the moisture content in a continuously conveyed batch of porous materials is described. The porous material is continuously fed through a treatment tank, wherein it is contacted with a liquid to be absorbed therein. The moisture content of the material is continuously monitored as a direct function of the combined weight of the material and the treatment tank to generate correction signals. The correction signals are utilized to vary the dwell times (up or down) of the porous material in the treatment tank. By varying the dwell times the porous material is contacted by the treating liquid for either larger or shorter periods until the weight of the tank and material therein returns to the weight desired. Thus, the moisture content of the porous material is continuously adjusted to a substantially constant value.

6 Claims, 1 Drawing Figure

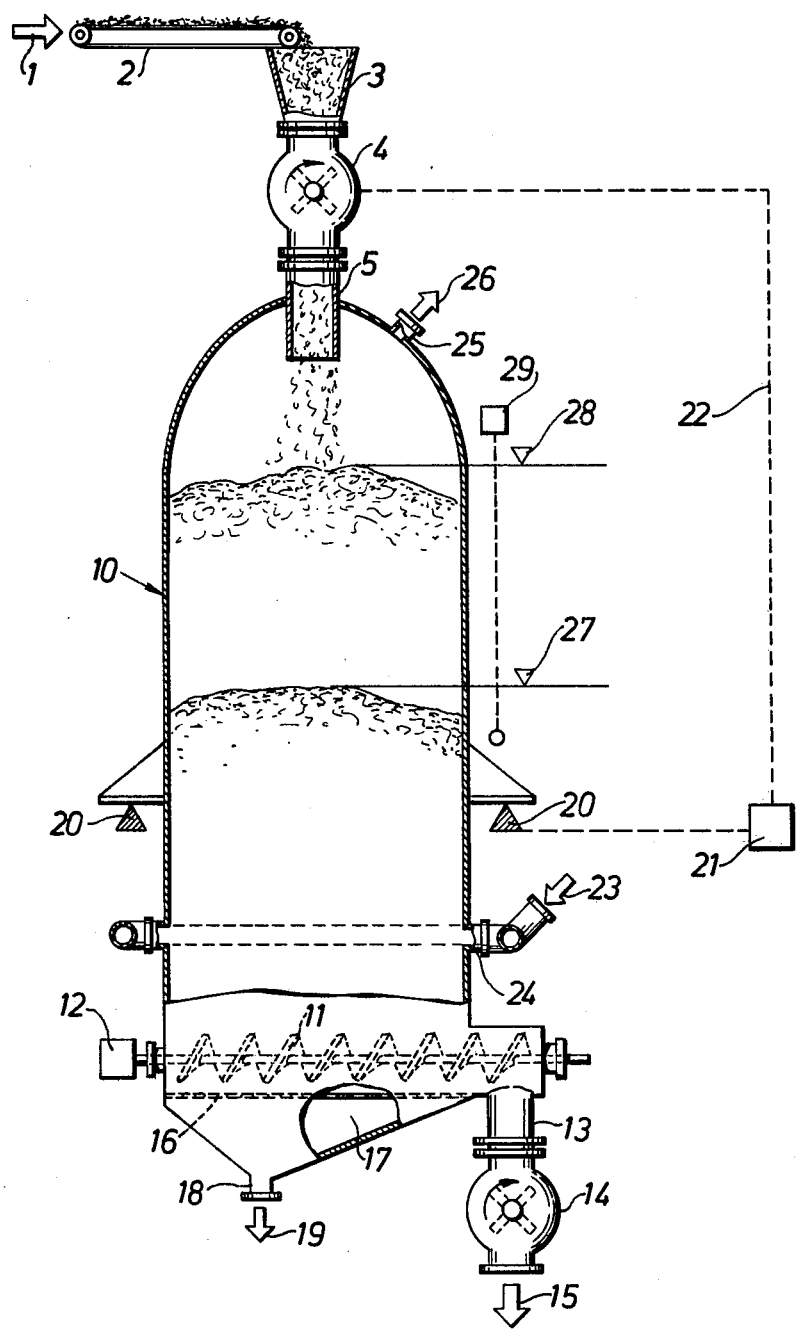

METHOD AND DEVICE FOR EQUALIZING THE MOISTURE CONTENT OF POROUS MATERIAL

This invention relates to equalizing the moisture content of porous materials, especially fiber materials within the cellulose industry in connection with decomposition or cooking of the fibrous material.

Previously it is known both for batch and continuous cooking to determine the moisture content of the raw material in different ways in order to facilitate the proper loading of cooking chemicals and thereby the proper concentration of the same during the cooking which brings about a better economy with regard to chemicals, a more uniform and better final product and a higher yield of the raw material. The determination of the moisture content has so far been accomplished by the withdrawing of samples which are tested with regard to the moisture content in a laboratory or continuously by means of electronic equipment available on the market. The determination or testing of the moisture content may also be accomplished in connection with the pre-treatment of the raw material, such as steaming, or in the cooker proper. In most cases one then has tried to give the material such thorough treatment that a uniform good result is obtained, but in practice it has been shown that certain variations of the moisture content continuosly occur. Reference is made to the following Patents where such treatment is shown.

In the Swedish Pat. No. 208,983 raw material is exposed to steaming with low pressure steam and then compression in order to remove air and gases from the pores of the raw material before it is soaked in the impregnating liquid. All the fiber material is, thus, principally undergoing the same treatment and the invention according to the Swedish Patent attempts to give the fiber material such a similar or uniform impregnation as possible before the same is exposed to the cooking proper. is also by means of lines connected with suitable devices for recovery of the condensate 19. By removing the condensate before the cooking process a better heat economy is obtained on one hand in that heating of the condensate to full cooking temperature is eliminated and on the other hand in that evaporation of the condensate is eliminated. The discharge device 11 rotates with a suitable rotational speed whereby a constant amount of chips is fed out through the outlet 13 to the device 14 which also rotates with a constant speed in order to give a practically constant outgoing stream of chips 15 to the following process step.

Due to a constant amount of ingoing chips and a constant amount of outgoing chips from the container a condition of equilibrium arises so that e.g. a chip level 27 is maintained in the container. The steam 23 which is added through the inlets 24 is distributed in the chip column and heats the same. The steam is condensed on the chip pieces and the condensate is absorbed by the same. Possible excess condensate which is not absorbed by the fiber material flows downwardly between the chip pieces and finally reaches the screen plate 16 by which the liquid is drained from the container through the chamber 17 and the outlet 18. By adding steam air is also expelled from the chip pieces and due to the temperature increase certain gases are also formed. Steam, air and gas are forced upwardly through the chip column and into the space above the chip level 27 and are discharged through the outlets 25.

During this time the instrument 21 records the weight of the container with contents and devices. When at a later time the moisture content of the fed chips 1 drops the chips become lighter and when a certain amount of this lighter chip type has been fed to the container the total weight which the instrument 21 records decreases. Since the instrument is adjusted to hold the weight constant the instrument through the line 22 gives an impulse to the feeding apparatus 4, whereby the apparatus increases the rotational speed so that a greater volume of chips is fed into the container per unit time. As the amount of chips 15 which is discharged from the container still is kept constant as before the chip level, which earlier was at the level 27, will gradually rise, which means that the weight of the container including the chips increases. The instrument 21 is so adjusted that the weight is allowed to increase until it has reached the same numerical value as when the chip level was in equilibrium at the level 27. This may for instance be the case when the chip level has reached the level 28. The instrument 21 then gives an impulse to the feeding apparatus 4 to decrease the rotational speed to one consistent with that of the discharging apparatus 14 so that the amount of fed chips equals the amount of discharged chips. Hereby a condition of equilibrium is again obtained. The now fed chips which are lighter due to a lower moisture content are held in the container a longer time due to the chip level being higher. Thus, the chips are able to absorb more moisture due to the longer time that they are in the container. Hereby the objects of the present invention are obtained.

If for any reason, the fed chips should be heavier, i.e. contain more moisture the result will be the opposite to that described above. The instrument 21 then records an increase of the weight of the container and produces a signal to the feeding apparatus 4 of a decrease or reduction of its rotational speed so that the amount of fed chips decreases which in its turn brings about a lowering of the chip level in the container until the adjusted weight is obtained whereby the rotational speed of the feeding apparatus 4 again is increased until a condition of equilibrium has been obtained with the amount which is discharged through the device 14. In this way the chips which are heavier due to the higher moisture content obtain a shorter dwell time in the container than the chips which are lighter due to a lower moisture content.

For practical reasons in the same container the upper and lower level respectively must be limited to a maximum and a minimum level respectively in order to avoid an improper high or low level in the container. In certain extreme cases the moisture content of the fed fiber material might be so high that — in order to keep the constant weight — the level would fall below the minimum level. In such case the steam flow can be closed and a drying medium such as hot air or fumes be automatically connected. Hereby the moisture content in the chip material column is decreased so that the constant weight again can be adjusted.

In U.S. Pat. No. 3,013,933 is described a method for pre-treatment of fiber material by means of steam of relatively high temperature and withdrawal of gases and acids formed during the steam treatment in order to reduce the consumption of chemicals in the following alkalious cooking. The patent relates primarily to batchwise cooking method wherein for each cooking cycle all fiber material gets the same treatment.

In U.S. Pat. No. 3,471,364 is described an apparatus for the pre-treatment of fiber material according to the principle of counter-current flow of the treatment medium under pressure. The apparatus can be used to feed the fiber material in a continuous stream to a continuous cooker or digester. The main object of the invention according to this Patent is to provide an apparatus for pre-heating and pre-conditioning of fiber material which besides being easy to manufacture also gives a high efficiency with regard to the removal of air present in the fiber material and to the pre-treatment of the fiber material. All the fiber material undergoes principally the same treatment and movement through the apparatus.

In the pending Swedish patent application Ser. No. 6648/60 a method and an apparatus are described for controlling the liquid balance in continuous pulp cooking to dose the liquid volume supplied to the digester regardless of moisture variations in the original fiber material. This method also recognizes the importance of controlling the dosage of the absolute quantity of chemicals, while at the same time the percentage of chemicals in the pulping liquid is kept under control. The invention according to the above-mentioned application aims to compensate the influence of the moisture variations on the liquid balance directly from a continuous measurement result of the moisture content, which differs from previously known systems for continuous cooking in a liquid-phase where a compensation for the moist fiber can be accomplished in that waste liquor, in a quantity controlled in response to the liquid level in the digester, is pumped into the discharge end of the digester. According to the method the moisture content of the fiber material is, thus, measured with an appropriate apparatus so that the sum volume of moist fiber and compensation liquid amounts to a predetermined constant value. All the fiber material in this method undergoes the same treatment, while the quantity of chemicals is varied in order to obtain the same concentration of chemicals in the cooking liquid.

None of the known systems referred to above for the pre-treatment of fiber material describes or proposes a method and an apparatus for pre-treatment according to the present invention. All the systems referred to describe, however, the importance of considering the varying moisture content of the raw material. The present invention has as its main object to accomplish, by means of a simple method and apparatus, a levelling or equalizing of the moisture content of porous materials. What is hereby sought to be protected will be clear from the appended claims.

The invention will hereinafter be described in closer detail with reference to the accompanying drawing which schematically shows an example of an apparatus suitable for carrying out the method of the present invention.

Fiber material 1, which e.g. may consist of chips from split wood, bamboo or the like, chopped straw, straw, bargasse or reed (hereinafter referred to only as chips for the sake of simplicity), arrives in a suitable manner from a silo or storage bin through a blowing line or as shown a conveyor 2 to a hopper 3, from where the chips are passed down into a feeding apparatus 4 which e.g. may consist of a pocket rotor in a housing. The dosage apparatus 4 is provided with a variable drive not shown and feeds the chips into a container 10 through an inlet 5. The container 10 may be cylindrical as shown or may have a greater diameter in the lower part in order to give the fiber material a certain relief when it swells and moves downwardly in the container. The container may further be designed to withstand a certain high-pressure or only atmospheric pressure depending on the process conditions. The pressure at which the container functions is not critical to the present invention. In the lower part of the container a discharge device is arranged, which e.g. may consist of a centrally disposed rotating scraper or one or several screws which extend over a part or the whole cross-section of the container horizontally or angularly to the horizontal plane to feed the chips to an outlet. For the sake of simplicity only one screw 11 is shown which is journalled at both ends and provided with a drive 12. The screw 11 feeds the chips to an outlet 13, which may be connected to a suitable dosage device 14, wherefrom the chips as indicated by the arrow 15 are fed to the next process step, not shown, which might be a continuous digester. In connection with the discharging device 11 a screen plate 16 is provided, through which the chips cannot pass. The screen is arranged to drain possibly free liquid, such as condensate formed, from the chips and should be of a self-cleaning type, e.g. in that the screw 11 rotates close thereto. The liquid is collected on the other side of the screen plate 16 in a chamber 17 wherefrom an outlet 18 is disposed through which the liquid 19 is passed out from the system. The container 10 is located and erected in a suitable way so that its total weight including the content of fiber material and devices fastened to the container can be measured. This may be accomplished e.g. by use of strain gauges arranged in connection with the bearing points 20 of the container. The weight-recording instrument is indicated by means of the square 21. The instrument 21 is connected through the line 22 to the dosage apparatus 4 in such a way that in a certain proportion the rotational speed of the dosage device 4 increases when the weight of the container decreases. A gaseous medium, e.g. steam indicated by arrow 23, is introduced into the container through one or several inlets 24 spaced around the periphery of the container. Suitably those inlets may be situated in the lower part of the container. In addition one or several outlets 25 are situated in the upper part of the container for the withdrawal of air and gas expelled from the fiber material as indicated by arrow 26. In this way the added medium 23 will flow upwardly in the container in counter-flow to the descending movement of the fiber material and thereby force air and gases in front of it out through the outlet 25. is also possible to locate the inlets 24 in the upper part of the container and the outlets 25 for air and gases in the lower part of the container for the opposite direction of movement of the added medium without departing from the spirit and scope of the present invention. In the container 10 there is provided a level indicator 29 and two different levels 27 and 28 of fiber material.

The whole container with the equipment described above may e.g. be situated ahead of a continuous digester for instance of the Kamyr-type. It is then suitable that the fiber material 15, which leaves the container in an essentially continuous stream and with an essentially constant volumetric flow consonant with the yelding capacity, is fed to the inlet end of the digester.

In the following example the function of the apparatus described above is given.

Fiber material 1 of a certain moisture content is fed by the feeder 4 which rotates with a certain speed of rotation in an essentially constant volumetric amount into the container 10 through the inlet 5. Steam 23 is fed through the inlets 24 in a certain quantity and with a certain pressure and temperature into the container where by means of devices not shown can distribute the steam in a suitable way. As an example of such, a distribution device can be provided including a spreading plate inside the inlets 24 in the container and in front of this plate a cylindrical shield around the entire interior periphery of the container. This shield may have a uniform distribution of openings or slots through which steam enters the container. In connection with the shield the diameter of the container may increase so that the downwardly moving fiber material gets a larger cross-section to move in, whereby the degree of packing of the fiber material decreases, which favourably affects the transmission of steam. The upper edge of the shield can coincide with and have the same diameter as the container while the lower edge of the shield may be spaced a certain distance from the below lying container wall of greater diameter, whereby this distance forms an opening which also may be closed by an additional perforated or slotted plate. Possibly, such shields and diameter increases may be arranged in several steps in the container which together with a conically sloping container wall affects the movement of the fiber material, so that even movement of the same is obtained. The outlets 25 can, by means of lines not shown, be connected to a suitable device for condensation of steam and gases for recovery of their contents of heat and chemicals. The outlet 18

An apparatus suitable for carrying out the present invention can be obtained with very simple means. Accordingly, one can obtain with little expense in existing apparatus instruments and control devices to accomplish by means of weighing of the fed material varying dwell times in the container to equalize the moisture content in the way described above.

The moisture content of the porous material in question may vary with longer or shorter intervals, e.g. from day to night or during shorter periods due to local conditions as e.g. weather, shipping method, storage method etc. How often the changes take place is of no importance for carrying out the invention as the object of the invention is to compensate for the changes which take place so that equalizing of the liquid quantity which flows with the porous material is obtained. The invention for equalizing of the moisture content in fiber material within the cellulose industry is also applicable within other branches of industry where it is of importance to obtain a uniform moisture content in porous moist absorbing materials.

The invention is not limited to the example given above but can be varied within the scope of the following claims.

What I claim is:

1. A method for automatically maintaining the moisture content of porous material in a fluid treatment chamber which material is continuously fed to a fluid treatment container, continuously treated with fluid, and continuously discharged from said container wherein the moisture content is maintained at a value which corresponds to the original weight of the container and porous material and fluid contained therein comprising the steps of:

continuously weighing said container and porous material and fluid contained therein;

continuously comparing the total weight of said container and said porous material and fluid contained therein with the original weight thereof corresponding to the original moisture content of the material in the fluid treatment chamber;

generating correction signals when the total weight of said container, said porous material, and fluid differ from said original weight; and modifying the dwell time of said porous material in said fluid treatment chamber in response to said correction signals to continously tend to maintain the total weight of said container, porous material and fluid therein at a value corresponding to said original moisture content.

2. The method according to claim 1 wherein said dwell time is modified in response to said correction signals by varying the rate of feed of porous material into said container while maintaining said discharge rate constant.

3. The method according to claim 1 including the further step of withdrawing gas and condensate from the container.

4. An apparatus for automatically maintaining the moisture content of porous material in a fluid treatment chamber, which material is continuously fed to an inlet in a fluid treatment container, continuously treated with fluid, and continuously discharged from an outlet in said container wherein the moisture content is maintained at a value which corresponds to the original weight of the container and porous material and fluid contained therein comprising:

means for continuously weighing said container and porous material and fluid contained therein;

means for continuously comparing the total weight of said container and said porous material and fluid contained therein with the original weight corresponding to the original moisture content of the material in the fluid treatment chamber and for generating correction signals when the total weight of said container, said porous material, and said fluid differ from said original weight; and means for modifying the dwell time of said porous material in said fluid treatment chamber in response to said control signals to continuously tend to maintain the total weight of said container, porous material, and said fluid at a value corresponding to said original moisture content.

5. The apparatus of claim 4 wherein said means for modifying said dwell time comprises:

means for varying the rate of feed of porous material into said container while maintaining said discharge rate substantially constant.

6. The apparatus of claim 5 further including screening means adjacent said outlet for separating said porous material from free liquid.

* * * * *